(12) United States Patent
Matono et al.

(10) Patent No.: US 11,509,813 B2
(45) Date of Patent: Nov. 22, 2022

(54) IMAGE PROCESSING DEVICE

(71) Applicant: Hitachi Automotive Systems, Ltd., Hitachinaka (JP)

(72) Inventors: Haruki Matono, Tokyo (JP); Yoshiyuki Mutou, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 61 days.

(21) Appl. No.: 16/962,984

(22) PCT Filed: Jan. 18, 2019

(86) PCT No.: PCT/JP2019/001386
§ 371 (c)(1),
(2) Date: Jul. 17, 2020

(87) PCT Pub. No.: WO2019/146510
PCT Pub. Date: Aug. 1, 2019

(65) Prior Publication Data
US 2020/0358962 A1 Nov. 12, 2020

(30) Foreign Application Priority Data

Jan. 26, 2018 (JP) .............................. JP2018-011250

(51) Int. Cl.
*H04N 5/225* (2006.01)
*H04N 5/232* (2006.01)
(Continued)

(52) U.S. Cl.
CPC .... *H04N 5/232122* (2018.08); *B60W 40/105* (2013.01); *G06T 5/006* (2013.01);
(Continued)

(58) Field of Classification Search
CPC ......... H04N 5/232122; H04N 5/23258; H04N 5/247; H04N 5/3572; H04N 2013/0081;
(Continued)

(56) References Cited

U.S. PATENT DOCUMENTS 9,884,585 B1 * 2/2018 Lubbers ................. B60Q 9/008
2004/0109060 A1 6/2004 Ishii
(Continued)

FOREIGN PATENT DOCUMENTS

JP 2004-146904 A 5/2004
JP 2004-354572 A 12/2004
(Continued)

OTHER PUBLICATIONS

International Search Report (PCT/ISA/210) issued in PCT Application No. PCT/JP2019/001386 dated May 7, 2019 with English translation (four pages).
Japanese-language Written Opinion (PCT/ISA/237) issued in PCT Application No. PCT/JP2019/001386 dated May 7, 2019 (five pages).
Japanese-language Office Action issued in Japanese Application No. 2018-011250 dated Jul. 13, 2021 (10 pages).

*Primary Examiner* — Stephen P Coleman
(74) *Attorney, Agent, or Firm* — Crowell & Moring LLP

(57) ABSTRACT

Provided is an image processing device that can accurately detect a target object, even when a high-distortion lens is used. According to the present invention, a camera 100 captures images in accordance with a synchronization signal Sig1, a camera 101 captures images in accordance with a synchronization signal Sig2, an area of interest setting unit 1033 sets an area of interest that represents a region to which attention is to be paid, a phase difference setting unit 1034 sets a shift .DELTA.t (a phase difference) for synchronization signal Sig1 and synchronization signal Sig2 that synchronizes the imaging timing of camera 100 and camera 101 with respect to the area of interest in the images captured by camera 100 and a region of the images captured by camera 101 that corresponds to the area of interest, and a synchronization signal generation unit 102 generates synchronization signal Sig1 and synchronization signal Sig2 on the basis of the shift .DELTA.t.

8 Claims, 6 Drawing Sheets

VERTICAL DEVIATION BY LENS DISTORTION (SURROUNDING PART)

VERTICAL DEVIATION BY LENS DISTORTION (CENTRAL PART)

(51) Int. Cl.
  *B60W 40/105* (2012.01)
  *G06T 5/00* (2006.01)
  *G06T 7/00* (2017.01)
  *H04N 5/247* (2006.01)

(52) U.S. Cl.
  CPC ....... *G06T 7/0014* (2013.01); *H04N 5/23258* (2013.01); *H04N 5/247* (2013.01); *G06T 2207/30196* (2013.01); *G06T 2207/30261* (2013.01)

(58) Field of Classification Search
  CPC . H04N 13/296; H04N 13/239; B60W 40/105; G06T 5/006; G06T 7/0014; G06T 2207/30196; G06T 2207/30261; G08G 1/16
  USPC .................................................. 348/207.99
  See application file for complete search history.

(56) References Cited

U.S. PATENT DOCUMENTS

| | | | |
|---|---|---|---|
| 2009/0115864 A1* | 5/2009 | Ogawa | H04N 1/0049 348/222.1 |
| 2013/0010084 A1* | 1/2013 | Hatano | H04N 13/106 348/47 |
| 2013/0028473 A1* | 1/2013 | Hilldore | G06V 20/56 382/103 |
| 2017/0267178 A1* | 9/2017 | Shiga | H04N 5/23296 |

FOREIGN PATENT DOCUMENTS

| | | |
|---|---|---|
| JP | 2010-267114 A | 11/2010 |
| JP | 2012-227773 A | 11/2012 |
| WO | WO 2011/132364 A1 | 10/2011 |
| WO | WO 2015/182753 A1 | 12/2015 |

\* cited by examiner

RIGHT AND LEFT SYNCHRONIZATION SIGNALS (WHEN IN HIGH SPEED)

RIGHT AND LEFT SYNCHRONIZATION SIGNALS (WHEN IN LOW SPEED)

VERTICAL DEVIATION BY
LENS DISTORTION
(SURROUNDING PART)

VERTICAL DEVIATION BY
LENS DISTORTION
(CENTRAL PART)

IMAGE PROCESSING DEVICE

TECHNICAL FIELD

The present invention relates to an image processing device.

BACKGROUND ART

PTL 1 is a background art of the technical field. This publication describes, as a problem to be solved, "The present invention is to provide an image recognition device which prevents erroneous detection of an object caused by deviation between the optical axes of a pair of imaging means capturing images of the same object by a rolling shutter method.", and as a solution, "The image recognition device is provided with: first and second imaging means which take images of the same object using respective imaging sensors of the rolling shutter method; object detection means which detects the disparity or position of the object on the basis of image information obtained from the first imaging means and that obtained from the second imaging means; and reading range change means which according to the amount of deviation between the optical axes of the first imaging means and the second imaging means, changes the range of lines to be read by the first imaging means and the second imaging means." (refer to Abstract).

Furthermore, a camera having a wide-angle lens is known conventionally. For example, PTL 2 discloses an imaging device having a wide-angle lens (so-called fisheye lens).

CITATION LIST

Patent Literature

PTL 1: JP 2012-227773 A
PTL 2: JP 2004-354572 A

SUMMARY OF INVENTION

Technical Problem

Conventionally, an attempt has been made to generate a synchronization signal in consideration of optical axis deviation with respect to a synchronization adjustment method for a stereo camera using a rolling shutter method. However, generation of a synchronization signal in a case where a high-distortion lens is used, as illustrated in FIG. 8, is not considered.

An object of the present invention is to provide an image processing device that can accurately detect a target object, even in a case where a high-distortion lens is used.

Solution to Problem

In order to achieve the above-described object, the present invention provides a first imaging unit that takes a first image in accordance with a first synchronization signal, a second imaging unit that takes a second image in accordance with a second synchronization signal, an area of interest setting unit that sets an area of interest that represents a region to which attention is to be paid, a phase difference setting unit that sets a phase difference for the first synchronization signal and the second synchronization signal that synchronizes imaging timing of the first imaging unit and the second imaging unit in the area of interest in the first image and a region in the second image that corresponds to the area of interest, and a synchronization signal generation unit that generates the first synchronization signal and the second synchronization signal on the basis of the phase difference.

Advantageous Effects of Invention

According to the present invention, it is possible to accurately detect a target object, even in a case where a high-distortion lens is used. Problems, configurations, and effects other than the above will be apparent by description of the following embodiments.

DESCRIPTION OF EMBODIMENTS

Hereinafter, embodiments of the present invention will be described with reference to the accompanying drawings. It should be noted that, although the accompanying drawings illustrate specific embodiments according to a principle of the present invention, these accompanying drawings are for understanding the present invention and are never used for limiting interpretation of the present invention.

First Embodiment

In recent years, a moving object detection device has been put into practical use, which detects a moving object such as a pedestrian or a vehicle by using a plurality of imaging units (cameras), such as stereo cameras. A stereo camera is a device that calculates positional deviation (disparity) of the same target object (three-dimensional object) on a plurality of images taken at the same time of day by using template matching, and calculates a position of the target object (three-dimensional object) in real space on the basis of the calculated disparity by using a known conversion formula.

This stereo camera calculates distance to a target object such as a pedestrian by using a pair of images taken by two imaging units and recognizes the target object, and can be applied to a monitoring system that detects intrusion by a suspicious person or abnormality, an in-vehicle system that supports safe driving of a vehicle, or the like.

Generally, a stereo camera used in a monitoring system or in-vehicle system as described above obtains distance by applying triangulation technology to a pair of images taken with a position interval, and includes at least two imaging units and a stereo image processing large scale integration (LSI) that is an image processing unit that performs triangulation processing on two images taken by these imaging units.

This stereo image processing LSI, which is the image processing unit, implements triangulation processing by performing processing of superimposing pixel information included in the pair of images to obtain a shift (disparity) of a matched position of the two images. Therefore, it is ideal that no deviation other than disparity is present between the pair of images, and it is necessary to make adjustment for each imaging unit so that there is no deviation in optical characteristic or signal characteristic, or to previously obtain a positional relation between the cameras, or the like.

Figure 7:
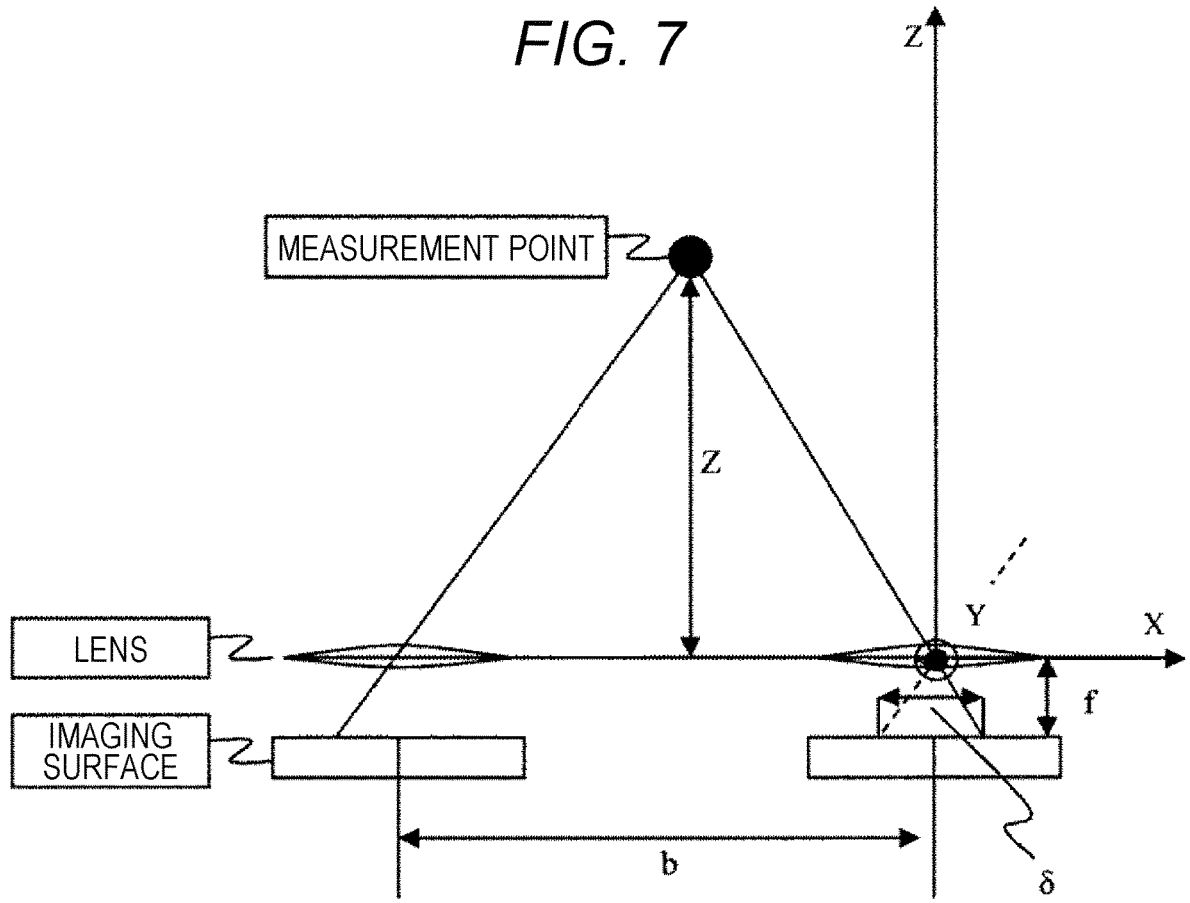
FIG. 7 is a diagram illustrating a principle of a stereo camera.
Figure 8:
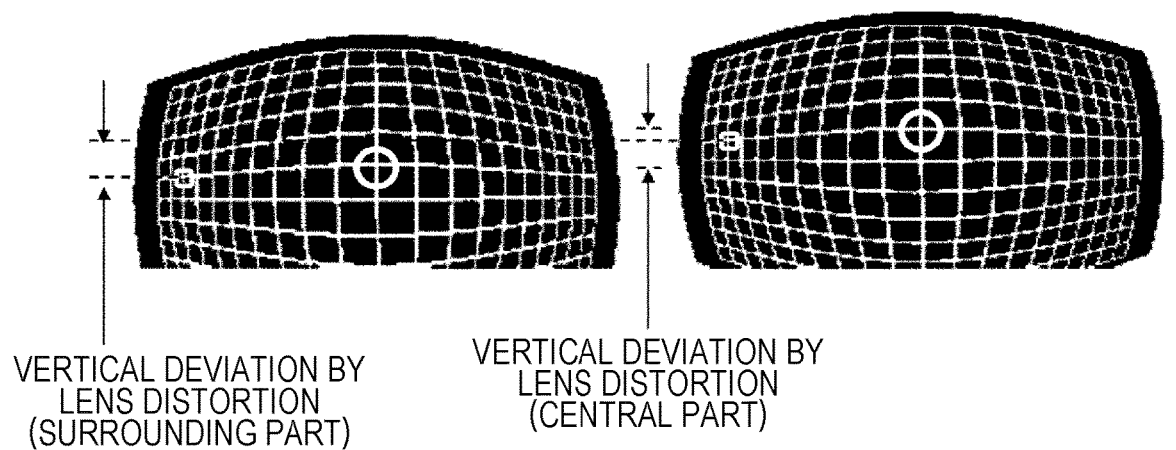
FIG. 8 is a diagram illustrating distortion of a high-distortion lens.

FIG. 7 is a diagram illustrating a general principle of a stereo camera. In FIG. 7, 5 represents disparity, Z represents measurement distance (distance from lenses to a measurement point), f represents focal distance (distance from an imaging surface to a lens), and b represents base length (length between two image sensors), which hold a relation as represented by the following formula (1).

[Formula 1]

$$Z = bf/\delta \qquad (1)$$

Figure 1:
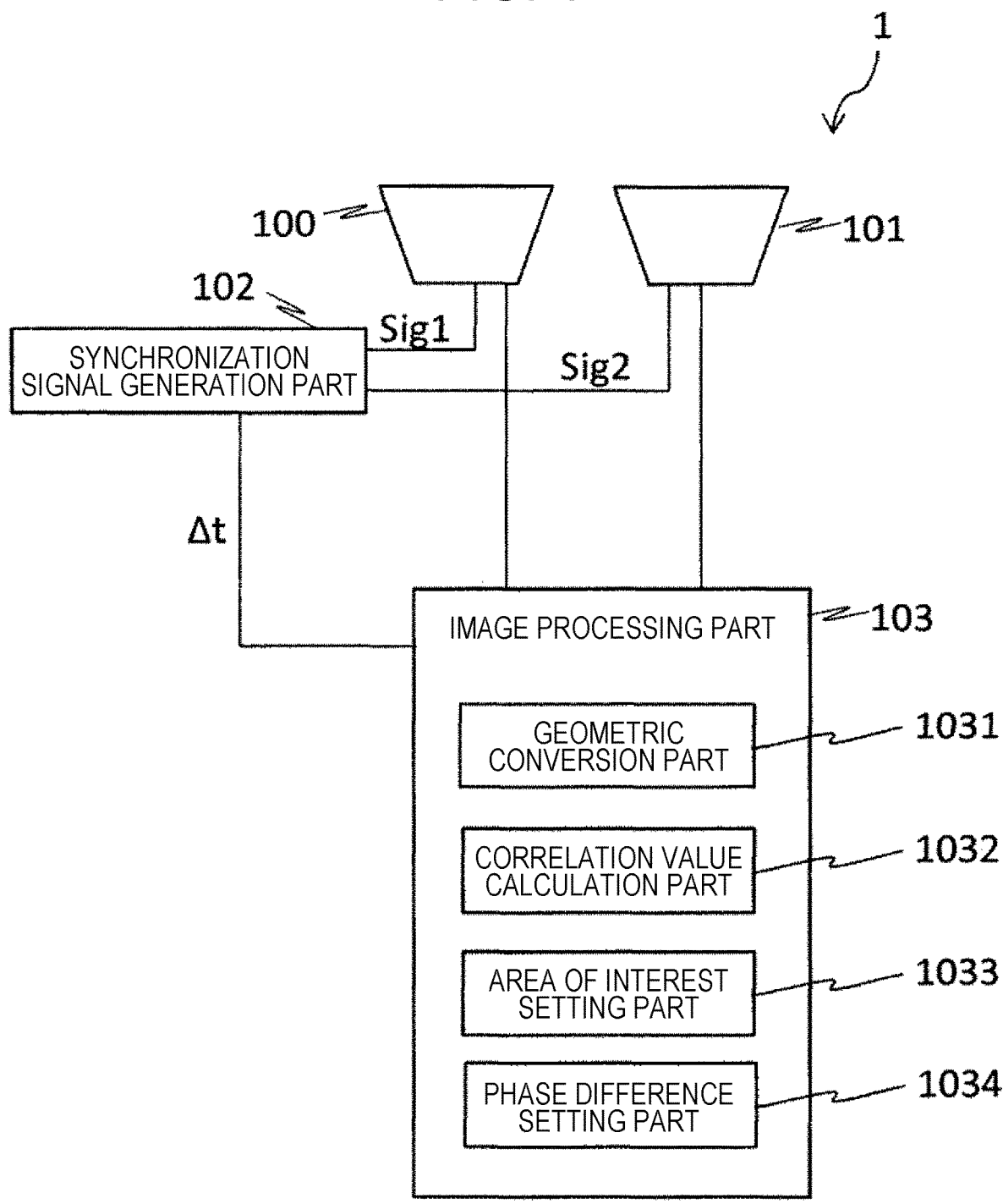
FIG. 1 is a configuration diagram illustrating an image processing device according to a first embodiment.

FIG. 1 illustrates an overall configuration of an image processing device 1 that is a stereo camera according to a first embodiment of the present invention. A camera 100 that is a first imaging unit and a camera 101 that is a second imaging unit are included, and stereo distance measurement is possible.

The camera 100 and the camera 101 use a Complementary Metal Oxide Semiconductor (CMOS) sensor as an example, and are driven on the basis of a synchronization signal. That is, the camera 100 (first imaging unit) takes an image (first image) in accordance with a synchronization signal Sig1 (first synchronization signal), and the camera 101 (second imaging unit) takes an image (second image) in accordance with a synchronization signal Sig2 (second synchronization signal). An operation method is a rolling shutter method in which shutter operations are sequentially performed for each scanning line by shifting timings, and a pixel signal is read by this method.

A synchronization signal generation unit 102 generates a synchronization signal that is a signal for synchronizing image capture timing so that the cameras 100 and 101 capture an image of a scene at the same time of day. Because distance is measured by deviation in vision between right and left images as described above, it is premised that the images are captured at the same time of day. Therefore, a signal is generated so that image capture timings for the right and left images are the same, and outputs the signal to the cameras 100 and 101.

An image processing unit 103 includes a geometric conversion unit 1031 that performs image processing (correction) so that distortion in images captured by the camera 100 and the camera 101 caused by lenses becomes parallel, a correlation value calculation unit 1032, an area of interest setting unit 1033, and a phase difference setting unit 1034.

The geometric conversion unit 1031 prepares a readout position table for each pixel in advance, and corrects distortion in an image by using a method for reconstituting an image according to the readout position table for each pixel, a method for performing calculation by a combination of horizontal movement, vertical movement, scaling, rotation, shear calculation, or the like.

The correlation value calculation unit 1032 horizontally searches a position having high correlation from the two images converted in the geometric conversion unit 1031 and performs calculation to identify the position (stereo matching). Difference between a search start position of the camera 100 of the stereo camera and a position having a highest correlation in the camera 101 is a disparity 5.

Here, the disparity 5 is large when distance to an object is short, and the disparity 5 is small when distance to an object is long. Although a method for calculating a correlation value uses a sum of absolute difference (SAD) in this embodiment, the present invention is not limited to this. To calculate the correlation value, several pixels are set as one block and comparison is performed for each block, and a point where a sum of absolute difference SAD, which is an index of a correlation value, is smallest is regarded as a point having a high correlation value.

The image processing unit 103 averages correlation values of a central vicinity (central unit) and a surrounding vicinity (surrounding unit) calculated for each pixel. A shift Δt between right and left synchronization signals is input to the synchronization signal generation unit 102. The synchronization signal generation unit 102 shifts the right and left synchronization signals according to the shift Δt of the synchronization signals. That is, the synchronization signal generation unit 102 generates the synchronization signal Sig1 (first synchronization signal) and the synchronization signal Sig2 (second synchronization signal) on the basis of the shift Δt (phase difference).

The image processing unit 103 gives a fixed amount of the shift Δt to the synchronization signal generation unit 102 a plurality of times, and separately calculates each average value of the correlation values of the central vicinity and the surrounding vicinity. Then, by changing the Δt (Δt1, Δt2, . . . , Δtn), calculation of an average value of the correlation values is repeated for each of the central vicinity and the surrounding vicinity. In a case where points Δt at which average values of the correlation values of the central vicinity and surroundings are maximized are the same, the shift Δt is set. In a case where the points at which average values of the correlation values of the central vicinity and the surroundings are maximized are different (for example, central vicinity: Δt1, surroundings: Δt2), either point is matched to another point, or either average value of a correlation value is set to be a similar level to another average value of a correlation value.

As described above, even if a correlation value cannot be obtained well in the surrounding vicinity and in the central vicinity overall, it is possible to adjust the correlation value to an average value of either the surrounding vicinity or the central vicinity, or both. For example, a correlation value is adjusted to a center in a case where the central vicinity is desired to be looked at more selectively, and to surroundings in a case where the surroundings are desired to be more focused at, so that accurate distance measurement can be performed depending on a situation.

In other words, the image processing unit 103 functions as the area of interest setting unit 1033 that sets an area of interest that represents a region to which attention is to be paid. In the present embodiment, the area of interest is either the surrounding vicinity or the central vicinity, or both. Furthermore, the image processing unit 103 functions as the phase difference setting unit 1034 that sets a shift Δt (phase difference) for the synchronization signal Sig1 (first synchronization signal) and the synchronization signal Sig2 (second synchronization signal) that synchronizes imaging timing of the camera 100 and the camera 101 with respect to the area of interest in an image (first image) taken by the camera 100 (first imaging unit) and a region of an image (second image) taken by the camera 101 (second imaging unit) that corresponds to the area of interest.

It should be noted that, in a case where predetermined brightness is detected in surrounding environment by a brightness sensor, or the like, the area of interest setting unit 1033 may set a middle unit between the central unit and the surrounding unit as the area of interest. When speed of an electronic shutter of the CMOS sensors (camera 100 and camera 101) is high, SCAN speed is high, and therefore the synchronization deviation is small.

Second Embodiment

Figure 2:
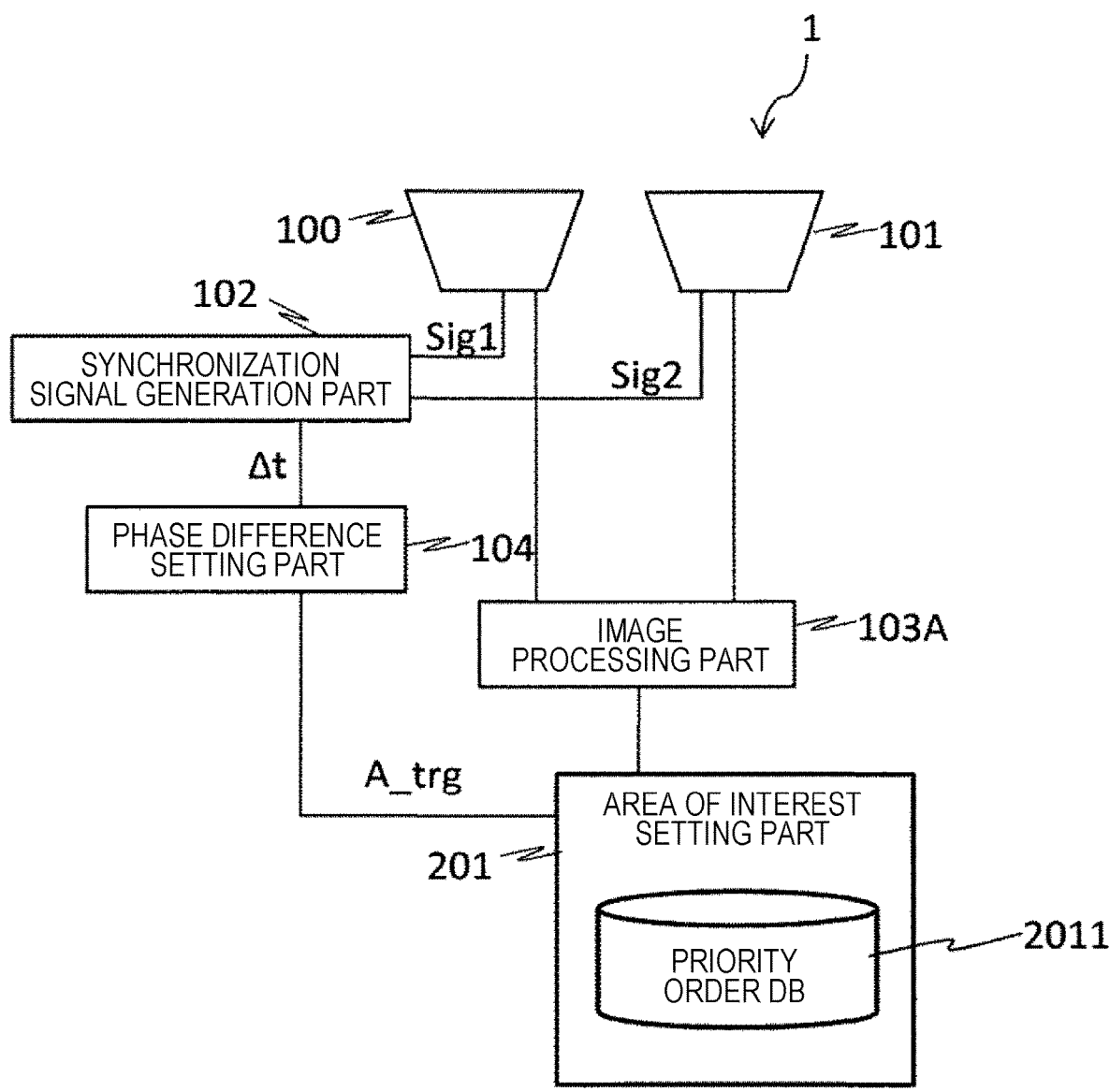
FIG. 2 is a configuration diagram illustrating an image processing device according to a second embodiment.

As illustrated in FIG. 2, a stereo camera (image processing device 1) of a second embodiment of the present invention includes an area of interest setting unit 201 and a phase difference setting unit 104 separately from an image processing unit 103A, as compared with the first embodiment. Furthermore, the area of interest setting unit 201 includes a priority order database 2011 (priority order DB). It should be noted that the image processing unit 103A of this embodiment includes, as an example, a geometric conversion unit 1031 and a correlation value calculation unit 1032.

The area of interest setting unit 201 identifies a position of or distance to a pedestrian or a vehicle by image processing. Priorities are assigned to these target objects, and an area of interest is set for a target object having a high degree of priority. That is, the priority order database 2011 stores, for example, a target object and a degree of priority of the target object. As a method for assigning priorities, for example, high priority is assigned to a thing close to an own vehicle, a pedestrian, or a thing which is positioned on a path of travel and has a possibility of a crash in a short time.

With this arrangement, it is possible to stabilize control of the own vehicle because accurate distance measurement can be performed by prioritizing a thing important for vehicle control.

In other words, the area of interest setting unit 201 sets an area of interest according to a situation. In a case where a region of a pedestrian is selected as the area of interest, a top of a head, which is a silhouette of a pedestrian, can be detected stably by setting an area to a portion around a neck that appears to be thinnest to match a phase difference (shift Δt of synchronization signal) with the portion. That is, in a case where a pedestrian is detected as a target object, the area of interest setting unit 201 sets a shift Δt (phase difference) of a synchronization signal so as to synchronize imaging timing of the camera 100 (first imaging unit) and the camera 101 (second imaging unit) at a position of a head of the pedestrian.

It should be noted that, in a case where a target object to which predetermined priority is assigned is detected, the area of interest setting unit 201 may set a region where the target object to which predetermined priority is assigned is detected as an area of interest. The predetermined priority means, for example, priority that is the predetermined priority or higher, priority that is the highest priority, or the like.

Furthermore, with respect to an area of interest A_trg set by the area of interest setting unit 201, the phase difference setting unit 104 sets a shift Δt (phase difference) for a synchronization signal Sig1 (first synchronization signal) and a synchronization signal Sig2 (second synchronization signal) that synchronizes the imaging timing of the camera 100 and the camera 101 with respect to the area of interest A_trg in an image (first image) taken by the camera 100 (first imaging unit) and a region of an image (second image) taken by the camera 101 (second imaging unit) that corresponds to the area of interest A_trg.

It should be noted that that the area of interest setting unit 201 may change a size of the area of interest according to a size of the target object. For example, the area of interest setting unit 201 sets the area of interest so that an entire target object is included. With this arrangement, distance to the target object can be calculated accurately.

Third Embodiment

Figure 3:
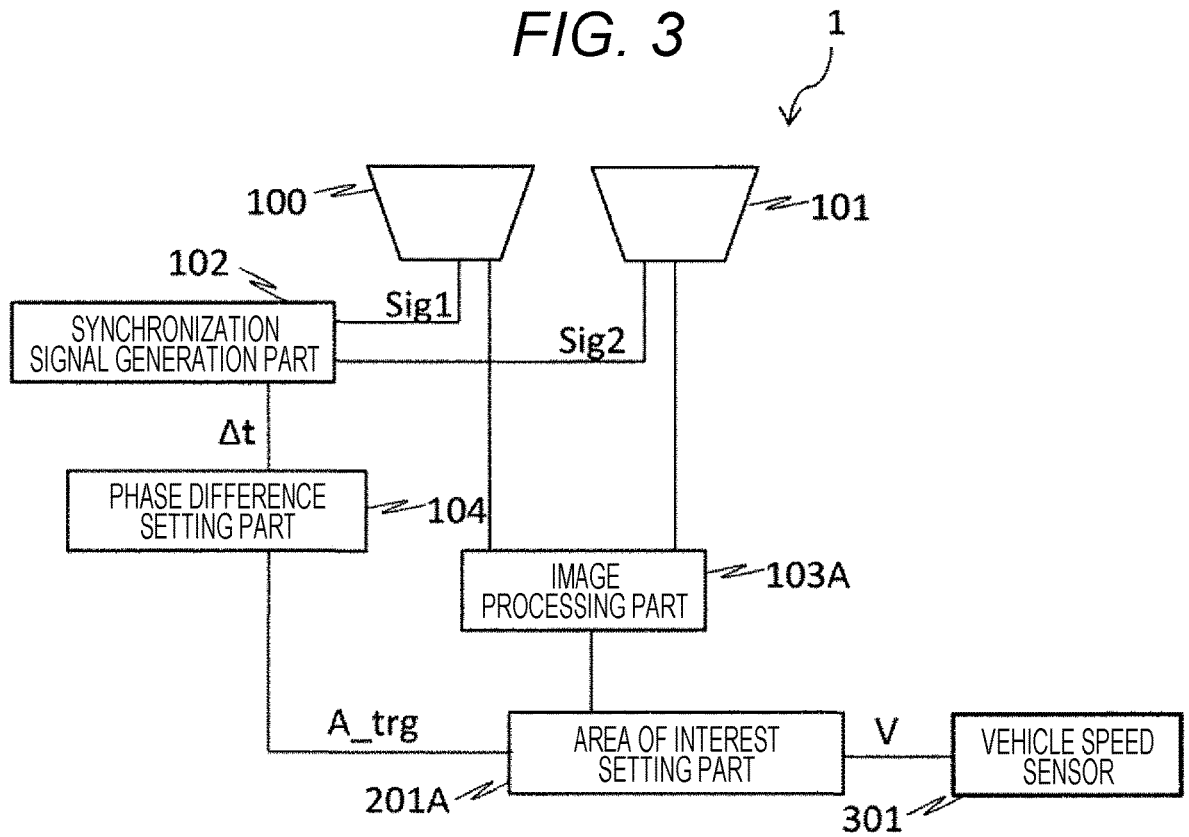
FIG. 3 is a configuration diagram illustrating an image processing device according to a third embodiment.

As illustrated in FIG. 3, a stereo camera (image processing device 1) of a third embodiment of the present invention includes a vehicle speed sensor 301 in addition to components of the second embodiment. The vehicle speed sensor 301 is connected to an area of interest setting unit 201. It should be noted that an area of interest setting unit 201A of this embodiment does not have the priority order database 2011 of the second embodiment.

When vehicle speed is high, the area of interest setting unit 201 sets an area to synchronize with a central portion, because only a central vicinity is required to be monitored. Meanwhile, when the vehicle speed is low, a phase difference (shift Δt of synchronization signal) is generated to be to synchronize with surrounding, because the surroundings must be widely monitored. That is, the area of interest setting unit 201A sets an area of interest according to speed of an own vehicle.

Specifically, the area of interest setting unit 201A sets a vicinity of a center of an optical axis (or a vicinity of vanishing point) of a camera 100 (first imaging unit) in an image (first image) as the area of interest in a case of high-speed traveling in which the speed of the own vehicle is equal to or higher than predetermined speed, and sets a surrounding unit of the image (first image) as the area of interest in a case of low-speed traveling in which the speed of the own vehicle is lower than the predetermined speed. It should be noted that, although the image (first image) taken by the camera 100 (first imaging unit) is used as a reference image in this embodiment, an image (second image) taken by the camera 101 (second imaging unit) may be used as a reference image.

Figure 6:
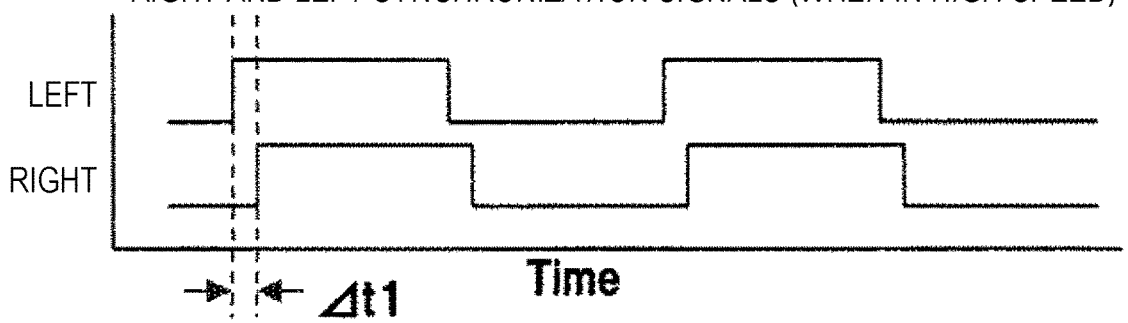
FIG. 6 is a conceptual diagram of a phase difference.
Figure 6:
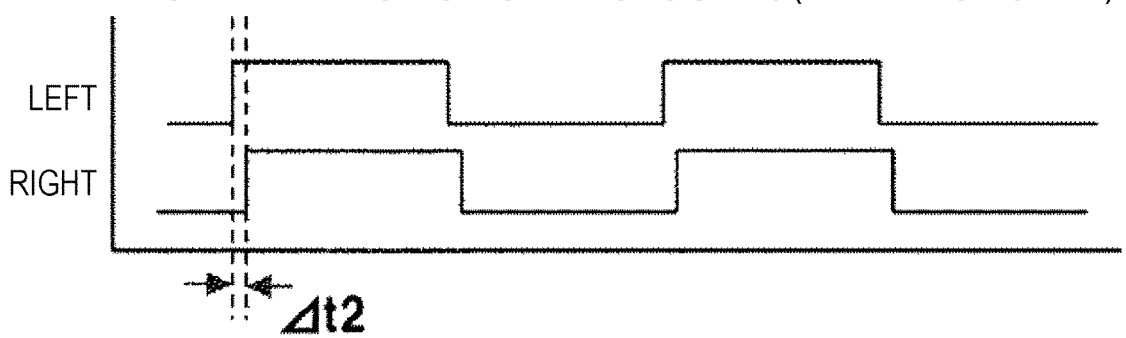

With this arrangement, even if an optimum amount of synchronization cannot be uniquely determined, it is possible to sufficiently cover a wide area necessary for vehicle control. FIG. 6 illustrates a conceptual diagram of synchronization signals when a synchronization position is shifted depending on vehicle speed. FIG. 6 represents a state where a shift Δt (phase difference) of a synchronization signal is variable for when the vehicle speed is high and when the vehicle speed is low. In the example of FIG. 6, a shift Δt1 of a synchronization signal when the vehicle speed is high is greater than a shift Δt2 of a synchronization signal when the vehicle speed is low. That is, the shift Δt of the synchronization signal increases as the vehicle speed increases.

Fourth Embodiment

Figure 4:
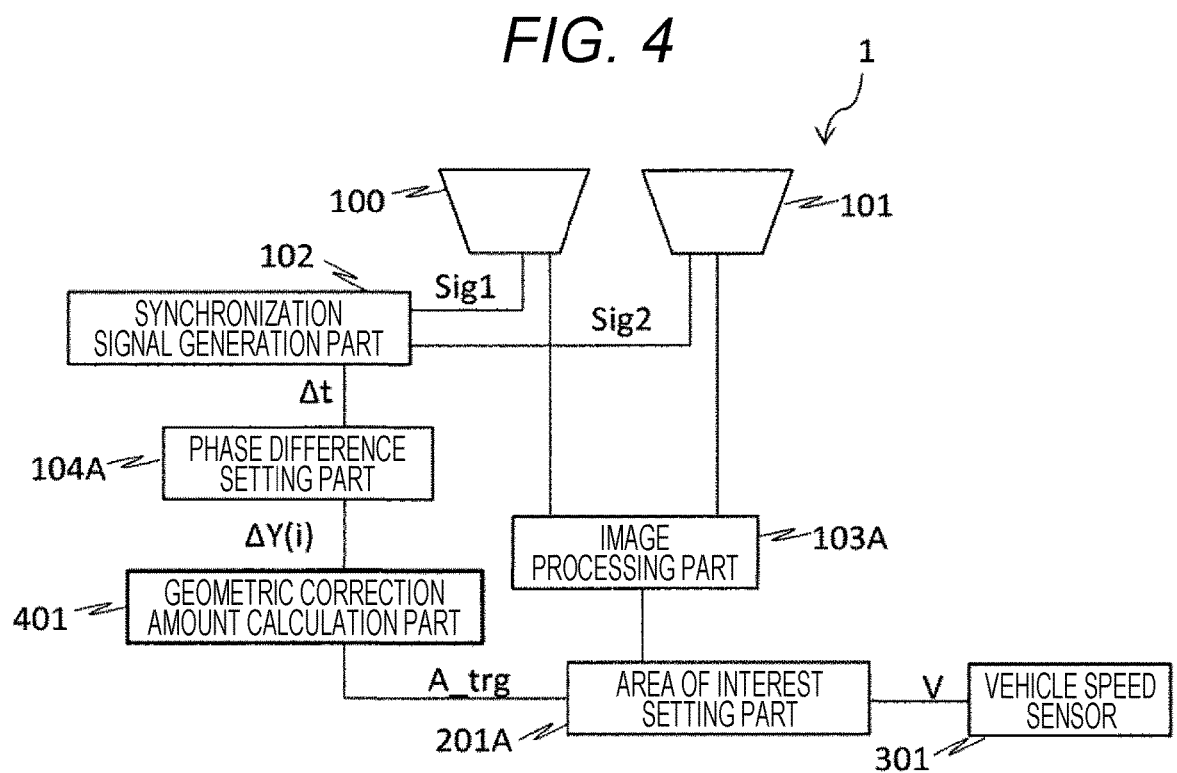
FIG. 4 is a configuration diagram illustrating an image processing device according to a fourth embodiment.

As illustrated in FIG. 4, a stereo camera (image processing device 1) of a fourth embodiment of the present invention includes a geometric correction amount calculation unit 401 in addition to components of the third embodiment. The geometric correction amount calculation unit 401 calculates a geometric correction amount ΔY (i) (deviation in a vertical direction) of an image (second image) taken by a camera 101 (second imaging unit) corresponding to an image (first image) taken by a camera 100 (first imaging unit), with respect to an area of interest A_trg. Specifically, the geometric correction amount ΔY (i) is calculated for each line (i) of an image.

A phase difference setting unit 104A calculates a temporal shift from the geometric correction amount ΔY (i) for each line of right and left cameras, and inputs, to the synchronization signal generation unit 102, the temporal deviation as a phase difference of synchronization (shift Δt of synchronization signal). That is, the phase difference setting unit 104A sets a shift Δt (phase difference) of the synchronization signal according to the geometric correction amount ΔY (i).

Each camera 100, 101 has a different distortion amount due to variation in manufacturing. Therefore, it is possible to keep a geometric correction amount ΔY (i) (calibration data) of each camera in advance and calculate how much correction should be made according to a position of interest (area of interest A_trg).

With this arrangement, even if a plurality of cameras having different characteristics are combined, an accurate phase difference (shift Δt of synchronization signal) can be calculated.

Fifth Embodiment

Figure 5:
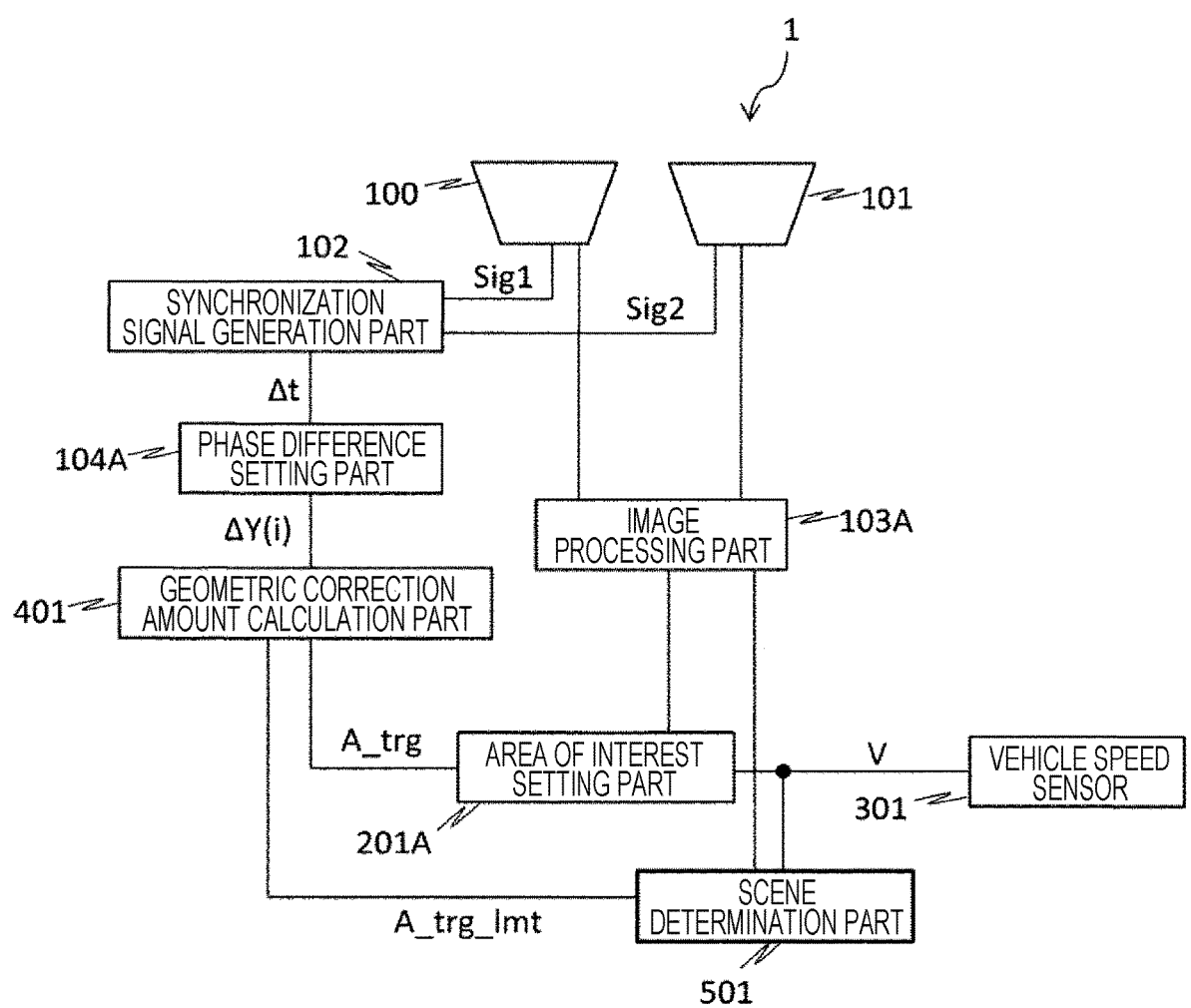
FIG. 5 is a configuration diagram illustrating an image processing device according to a fifth embodiment.

As illustrated in FIG. 5, a stereo camera (image processing device 1) of a fifth embodiment of the present invention includes a scene determination unit 501 in addition to a configuration of the fourth embodiment. The scene determination unit 501 calculates information A_trg_lmt that limits an area of interest A_trg by GPS map information or image analysis information.

When an intersection is detected by GPS information, a phase difference is adjusted so that a dangerous point at the intersection can be measured selectively. That is, the scene determination unit 501 detects a dangerous point at an intersection from GPS information and outputs the information as information A_trg_lmt that limits the area of interest A_trg. A geometric correction amount calculation unit 401 calculates a geometric correction amount ΔY (i) with respect to the dangerous point at the intersection in the area of interest A_trg.

Furthermore, in a case where analysis on a situation of luminance or an edge of an image determines that distance calculation is difficult because luminance pattern cannot be obtained (for example, coal black, no shading, or the like), a phase difference (shift Δt of synchronization signal) is calculated so as to synchronize with an important area in a position excluding the region where luminance pattern cannot be obtained. That is, the scene determination unit 501 detects a region for which disparity cannot be calculated and outputs the information as information A_trg_lmt that limits the area of interest A_trg. In a case where a region for which disparity cannot be calculated is detected, the geometric correction amount calculation unit 401 calculates a geometric correction amount ΔY (i) with respect to a region except for the region for which disparity cannot be calculated in the area of interest A_trg.

With this arrangement, disparity can be correctly calculated with high priority with respect to a location for which disparity calculation can be stably calculated. This method is efficient, because even if a synchronization signal is synchronized with an area where distance is unlikely to be detected stably, it will be useless if the distance cannot be calculated.

It should be noted that the scene determination unit 501 may detect a state of emergency braking from a change rate of speed of an own vehicle V, and, in a case where the state of emergency braking is detected, an area of interest setting unit 201A may fix the area of interest A_trg and calculate a geometric correction amount ΔY (i). With this arrangement, unintentional distortion of an image can be prevented.

Furthermore, the scene determination unit 501 detects a vertical shake of an own vehicle with predetermined magnitude or more by using an acceleration sensor, or the like, and in a case where a vertical shake of an own vehicle with the predetermined magnitude or more is detected, the area of interest setting unit 201A switches between a central unit of an image (first image) taken by a camera 100 (first imaging unit) and a surrounding unit of the image (first image) at a predetermined time ratio, and sets as the area of interest. In a case where the predetermined time ratio is 1:1, the central unit and the surrounding unit are switched alternately. Because large pitching (vertical shape) has a significant effect, the area of interest cannot be determined uniquely. Therefore, the area of interest is determined by switching the central unit and the surrounding unit alternately.

As described above, according to this embodiment, it is possible to accurately detect a target object, even in a case where a high-distortion lens is used.

It should be noted that the present invention is not limited to the above-described embodiments, but also includes various modifications. For example, the description of the embodiments, which has been provided above in detail, is intended to describe the present invention in an easily understandable manner and accordingly, the above-described embodiments are not necessarily limited to the one that includes all the configurations described above. Furthermore, it is possible to replace a unit of the configuration of an embodiment with the configuration of another embodiment, and also possible to add, to the configuration of an embodiment, the configuration of another embodiment. Furthermore, it is also possible to add another configuration to a unit of the configuration of each embodiment, delete a unit of the configuration of each embodiment, and replace a unit of the configuration of each embodiment with another configuration.

Furthermore, each of the above-described configurations and functions, and the like may be partially entirely implemented by hardware through, for example, a design with an integrated circuit. Furthermore, each of the above-described configurations and functions, and the like may be implemented by software with a processor interpreting and executing a program to implement each function. A program to implement each function and information such as a table and a file can be located in a recording device such as a memory, a hard disk, and a solid state drive (SSD) or a recording medium such as an IC card, an SD card, and a DVD.

It should be noted that the embodiments of the present invention may have the following aspects.

(1). An image processing device including a synchronization control unit that includes a plurality of imaging units and performs synchronization control for each of the imaging units, a phase difference setting unit that sets a phase difference for a synchronization signal to each of the imaging units, and an area of interest setting unit that determines a region of interest, in which the phase difference setting unit varies a phase value according to an area of the area of interest setting unit.

(2). The image processing device according to (1) including a geometric correction amount calculation unit that calculates a geometric correction amount of each of the imaging units, which calculates such a phase difference that synchronizes timing of imaging with an area of interest.

(3). The image processing device according to (1) or (2) including an own vehicle speed detection unit, in which a synchronization signal control unit switches an adjustment position of the phase difference according to speed of an own vehicle.

(4). The image processing device according to (1) or (2), in which the area of interest determination unit sets a vicinity of a center of an optical axis in an imaging unit when in high-speed traveling and sets a surrounding unit when in low-speed traveling, according to vehicle speed sensor information. The area of interest determination unit sets a control target region in a case where a scene determination unit detects a control target object on a path of travel. The area of interest determination unit fixes a setting region to prevent unintentional distortion of an image when the scene determination unit determines a state of emergency braking.

(5). The image processing device according to any one of (1) to (4), in which the area of interest determination unit sets a phase value that synchronizes with a position of a head when a pedestrian is focused on.

(6). The image processing device according to any one of (1) to (4) including a disparity calculation feasibility determination unit, which does not synchronize a phase difference with a region where the disparity calculation feasibility determination unit determines that disparity calculation is difficult.

(7). The image processing device according to any one of (1) to (6), in which an own vehicle speed detection unit, a posture change detection unit that detects a posture change of an imaging unit, and the synchronization signal control unit switch to time division control according to a result of the posture change detection unit.

(8). The image processing device according to any one of (1) to (7), in which the area of interest determination unit switches an arbitrary area in a screen at timing of an arbitrary cycle.

According to the above-described (1) to (8), with respect to an image taken by an imaging device (imaging unit), an effect of a portion of the image, which has deteriorated image quality, can be reduced.

REFERENCE SIGNS LIST 100, 101 camera
102 synchronization signal generation unit
103, 103A image processing unit
104, 104A phase difference setting unit
201, 201A area of interest setting unit
301 vehicle speed sensor
401 geometric correction amount calculation unit
501 scene determination unit
1031 geometric conversion unit
1032 correlation value calculation unit
1033 area of interest setting unit
1034 phase difference setting unit
2011 priority order database

The invention claimed is:

1. An image processing device comprising:
a first imaging unit that takes a first image in accordance with a first synchronization signal;
a second imaging unit that takes a second image in accordance with a second synchronization signal;
an area of interest setting unit that sets an area of interest that represents a region to which attention is to be paid;
a phase difference setting unit that sets a phase difference for the first synchronization signal and the second synchronization signal that synchronizes imaging timing of the first imaging unit and the second imaging unit with respect to the area of interest in the first image and a region in the second image that corresponds to the area of interest;
a synchronization signal generation unit that generates the first synchronization signal and the second synchronization signal on the basis of the phase difference; and
a scene determination unit that detects a vertical shake of an own vehicle with predetermined magnitude or more;
wherein, in response to where a vertical shake of an own vehicle with predetermined magnitude or more is detected, the area of interest setting unit switches between a central unit of the first image and a surrounding unit of the first image at a predetermined time ratio, and sets as the area of interest; and
wherein the area of interest setting unit sets the area of interest according to a situation including a brightness detected in a surrounding environment of the image processing device.

2. The image processing device according to claim 1 comprising a vehicle speed sensor that measures speed of an own vehicle,
wherein the area of interest setting unit sets the area of interest according to speed of an own vehicle.

3. The image processing device according to claim 2, wherein the area of interest setting unit sets a vicinity of a center of an optical axis of the first imaging unit in the first image as the area of interest in a case of high-speed traveling in which the speed of the own vehicle is equal to or higher than predetermined speed, and sets a surrounding unit of the first image as the area of interest in a case of low-speed traveling in which the speed of the own vehicle is lower than the predetermined speed.

4. The image processing device according to claim 1, wherein, in a case where a target object to which predetermined priority is assigned is detected, the area of interest setting unit sets a region where the target object to which predetermined priority is assigned is detected as the area of interest.

5. The image processing device according to claim 4, wherein, in a case where a pedestrian is detected as the target object, the area of interest setting unit sets the phase difference so as to synchronize imaging timing of the first imaging unit and the second imaging unit at a position of a head of the pedestrian.

6. The image processing device according to claim 1 comprising a geometric correction amount calculation unit that calculates a geometric correction amount of the second image corresponding to the first image with respect to the area of interest,
wherein the phase difference setting unit sets a phase difference according to the geometric correction amount.

7. The image processing device according to claim 6 comprising a scene determination unit that detects a state of emergency braking,
wherein the area of interest setting unit fixes the area of interest and calculates the geometric correction amount in a case where a state of emergency braking is detected.

8. The image processing device according to claim 6 comprising a scene determination unit that detects a region for which disparity cannot be calculated, wherein, in a case where a region for which disparity cannot be calculated is detected, the geometric correction amount calculation unit calculates the geometric correction amount with respect to a region except for the region for which disparity cannot be calculated in the area of interest.

* * * * *